DISCRIMINATOR
Filed April 2, 1957
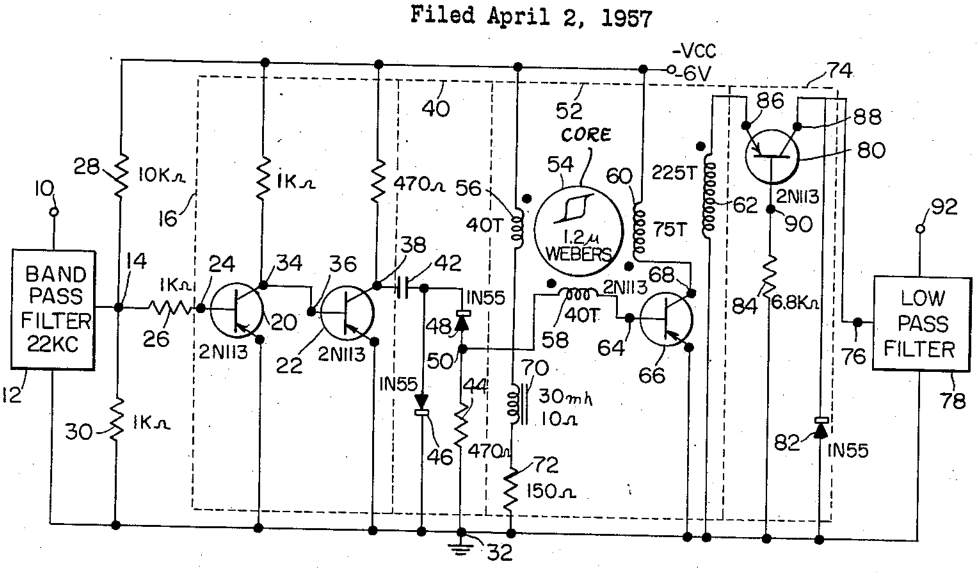
Fig. 1
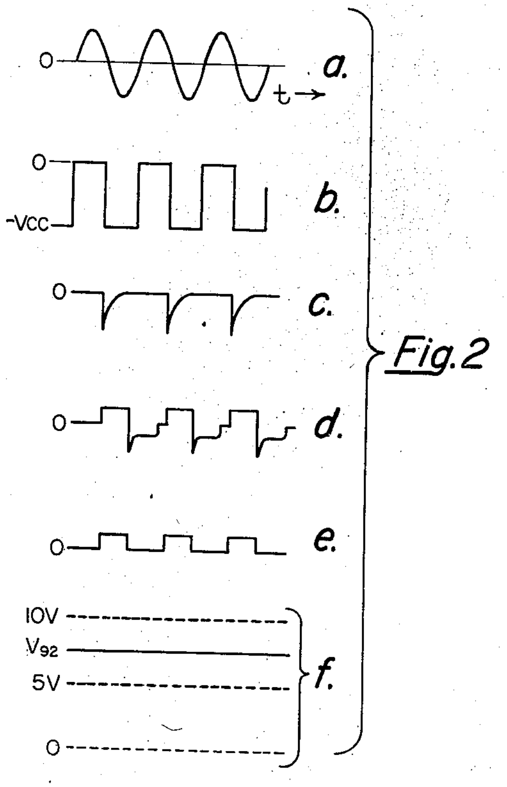
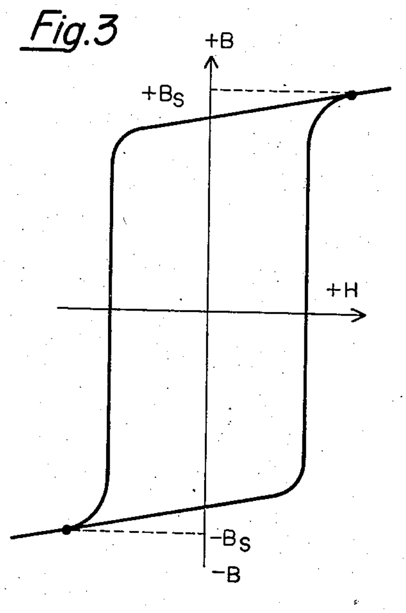
*INVENTOR.*
ROBERT M. TILLMAN
BY
Edward W. Hughes
ATTORNEY United States Patent Office 2,900,508
Patented Aug. 18, 1959

2,900,508

DISCRIMINATOR

Robert M. Tillman, Willow Grove, Pa., assignor to Burroughs Corporation, Detroit, Mich., a corporation of Michigan Application April 2, 1957, Serial No. 650,122
4 Claims. (Cl. 250—31)

This invention relates to discriminators, and more particularly to a solid-state subcarrier discriminator useful in telemetry.

Telemetry is a means for obtaining data at a position remote from the source of the data. Normally the phenomena to be measured are first converted to electrical signals by sensing instruments. The electrical signals are then changed to forms which are suitable for transmission to a receiving station. At the receiving station the transmitted signals are demodulated to produce output voltages which are proportional to the electrical signals produced by the sensing instruments.

In order to increase the number of data channels that can be transmitted to a receiving station by radio, for example, without increasing the number of transmitting channels, some form of multiplexing is customarily used. Frequency division multiplexers of the F.-M./F.-M. type are one of the types commonly used in telemetry. In such a system the output signal of one subcarrier oscillator forms one data channel. The output signal of the subcarrier oscillator is frequency modulated by the signal produced by one or more of the sensing instruments measuring one or more phenomena. The outputs of a plurality of such subcarrier oscillators, up to 18 in one standardized system, sequentially frequency modulate the radio frequency carrier of the system.

At the receiving station, the radio frequency signal is applied to a R.-F. discriminator, the output of which corresponds to the signals which modulate the carrier frequency at the transmitter. The output of the R.-F. discriminator is then applied to a number of subcarrier discriminators, the number of such discriminators being equal to the number of subcarrier oscillators, or data channels, used to modulate the carrier frequency at the transmitter. Each of the subcarrier discriminators is connected to the R.-F. discriminator through a band pass filter designed to pass only signals having the same center frequency as that of its corresponding subcarrier oscillator. The output signal produced by a subcarrier discriminator is proportioned to the signals which modulated the subcarrier oscillator having the same center frequency as the discriminator.

In order for the output of the subcarrier discriminator to be as nearly proportional as possible to that of the signal produced by the sensing instruments at the transmitting end of the system, it is necessary that the linearity, reliability, and stability of the subcarrier discriminators be maximized. Since the receiving stations may be mobile, it is also desirable that the weight, volume, and power requirement of the discriminators be minmized.

It is, therefore, an object of this invention to provide an improved discriminator.

It is a further object of this invention to provide a solid-state subcarrier discriminator.

It is a still further object of this invention to provide a discriminator whose linearity and stability are independent of variations of the supply voltage supplied to said discriminator over a substantial range of values.

It is another object of this invention to provide a frequency discriminator of the pulse-averaging type, the voltage-time product of the pulses of which are substantially independent of the variations in the supply voltage.

It is still another object of this invention to provide a discriminator, all the components of which are solid state devices.

Other objects and many of the attendant advantages of this invention will be readily appreciated as the same become better understood by reference to the following detailed description when considered in connection with the accompanying drawings wherein:

Fig. 1 is a schematic diagram of the circuit;

Fig. 2 is a chart of typical waveforms at various terminals of the circuit of Fig. 1;

Fig. 3 is an idealized hysteresis curve of a magnetic material such as is used in the device of Fig. 1.

Referring to Fig. 1, input terminal 10 is adapted to have applied to it F.-M. signals such as are produced by an R.-F. discriminator at the receiving station of a radio telemetry system. Signals within the band width of filter 12 are applied to input terminal 14 of amplifying circuit 16. The waveforms of the signals applied to terminal 14 are essentially sinusoidal as illustrated in Fig. 2*a*. The center frequency of filter 12 is chosen to coincide with the center frequency of one of the subcarrier oscillators used to modulate the transmitted signal at the transmitting station; in the example illustrated, the center frequency of filter 12 is 22 kilocycles.

Amplifier 16 is illustrated as having two stages of amplification, the first stage being provided by transistor 20 and the second being provided by transistor 22. Transistors 20, 22 are p-n-p transistors in the common emitter configuration. Base 24 of transistor 20 is connected by resistor 26 to amplifier input terminal 14. The potential of input terminal 14 is maintained at the proper D.-C. voltage level by the voltage dividing network which consists of resistors 28, 30 connected in series between a source of collector potential $V_{cc}$, which is not illustrated, and point 32 which is at reference, or ground potential. Collector 34 of transistor 20 is directly connected to base 36 of transistor 22.

The gain of amplifier 16 is designed to be sufficiently large so that the signal applied to terminal 14 is amplitude-limited, with the result that the waveform of the potential of collector 38 of transistor 22 is substantially a square wave as illustrated in Fig. 2*b*. It should be noted that in this example the waveform at collector 38 is in phase with the input signal applied to input terminal 10. The square wave output signal of amplifier circuit 16 is applied to differentiating circuit 40.

Differentiating circuit 40 consists basically of capacitor 42 and resistor 44 connected in series between collector 38 of transistor 22 and ground. Diodes 46 and 48 are added to the basic differentiating circuit so that the output pulses produced at output terminal 50 of circuit 40 are restricted to negative-going trigger pulses such as illustrated in Fig. 2*c*. These trigger pulses occur substantially at the negative-going cross-over point of the input signal applied to terminal 14, and one such pulse is produced for each cycle of the input signal in the embodiment illustrated.

The negative trigger pulses produced by differentiating circuit 40 are applied to blocking oscillator 52. Core 54 of oscillator 52 is preferably toroidal and is made of magnetic material having a substantially rectangular hysteresis loop such as is illustrated in Fig. 3. Core 54 has wound on it windings 56, 58, 60, 62. Each of the windings 56, 58, 60, 62 wound on core 54 is illustrated as having one of its two terminals dotted. By convention the coils are wound on core 54 in such a direction that when conventional electrical current flows into the dotted terminal of a winding, the magnetic flux produced by the current will tend to switch such a core to its "0" magnetic state; and when conventional electrical current flows out of the dotted terminal the magnetic flux produced by the current will tend to switch such a core to its "1" magnetic state.

The undotted terminal of base winding 58 is connected to base 64 of transistor 66, and the dotted terminal of base winding 58 is connected to output terminal 50 of differentiating circuit 40. The undotted terminal of collector, or load, winding 60 is connected to the negative terminal of the source of collector potential V*cc*, and the dotted terminal of winding 60 is connected to collector 68 of transistor 66. The dotted terminal of bias winding 56 is connected to the negative terminal of the source of collector potential V*cc*, and the undotted terminal is connected through inductor, or coil, 70 and resistor 72 to point 32, which is at reference potential.

In the absence of a signal at output terminal 50 of differentiating circuit 40, terminal 50 will be substantially at ground potential and base 64 of transistor 66 will also be at ground potential. As a result transistor 66 is cut off and substantially no current flows through collector winding 60. Direct current will flow through bias winding 56 since a D.-C. path is provided between terminal 32 and the negative terminal of the source of collector potential V*cc* through inductor 70 and resistor 72. This current flows out of the dotted terminal of winding 56, and its magnitude, which is determined by the magnitude of resistor 72 and the magnitude of V*cc* is made sufficiently large to switch core 54 to, and to maintain it in, its "1" state.

When a negative trigger pulse of sufficient amplitude and duration is applied through winding 58 to base 64 of transistor 66, it causes transistor 66 to begin to conduct. Collector current then flows into the dotted terminal of winding 60. This collector current starts to switch core 54 has switched to its "0" state. When core 54 reaches magnetic flux as core 54 switches from its "1" state toward its "0" state induces an E.M.F. in base winding 58 such as to make base 64 of transistor 66 more negative; so that regeneration takes place, and transistor 66 will saturate, or bottom, and remain bottomed until core 54 has switched to its "0" state. When core 54 reaches its "0" state, the regenerative voltage is no longer induced in base winding 58 and transistor 66 cuts off. The D.-C. current flowing through bias winding 56 will then drive core 54 back to its "1" state where it will remain until the next negative trigger pulse is applied to base 64 of transistor 66.

As core 54 switches from its "0" to its "1" state and from its "1" to its "0" state, output voltages having waveforms similar to that illustrated in Fig. 2*d* are induced in output winding 62. These output voltages are rectified by rectifying circuit 74 so that only the positive going pulses, in the particular application illustrated, are applied to input terminal 76 of low-pass filter 78.

Rectifying circuit 74 is illustrated as comprising transistor 80, diode 82, and base resistor 84. The dotted terminal of winding 62 is connected to emitter 86 of transistor 80. Input terminal 76 of filter 78 is connected to collector 88 of transistor 80. Base 90 of transistor 80 is connected through base resistor 84 to point 32, which is at ground potential.

When core 54 is being switched from its "1" to its "0" state, the voltage induced in winding 62 is such as to make its dotted terminal positive. This forward biases the emitter base junction of transistor 80, and causes collector current to flow. When the voltage induced in winding 62 causes the dotted terminal of winding 62 to be negative, which occurs when core 54 is switching from the "0" to the "1" state, transistor 80 is cut off because the emitter base junction of transistor 80 is reverse biased. Diode 82 is poled to prevent collector 88 of transistor 80 from going negative. As a result only positive pulses, such as are illustrated in Fig. 2*e* are applied to the input terminal 76 of filter 78. The use of a transistor in rectifying circuit 74 has the advantage that rectification is more nearly ideal, as compared with rectification using diodes.

Each of the positive pulses applied to low-pass filter 78 from rectifying circuit 74 has a substantially constant voltage time product, as will be explained subsequently, and one such pulse is applied to filter 78 for each cycle of the input signal applied to terminal 14. In filter 78 these pulses are integrated so that the potential at output terminal 92 is a slowly varying unidirectional voltage whose instantaneous amplitude is determined by the rate at which the positive pulses having a constant voltage time product are applied to it. As a result, the voltage of output terminal 92 of filter 78, as illustrated in Fig. 2*f*, is a D.-C. voltage whose amplitude is substantially a linear function of the instantaneous frequency of the input signal applied to input terminal 14.

Referring to Fig. 3, which is an idealized rectangular hysteresis loop of a material such as core 54 may be made of, the "0" magnetic state of core 54 may be defined as occurring when the core has a flux density of $-B_s$ and the "1" magnetic state may be defined as occurring when a core has a flux density of $+B_s$. Once the magnitude of V*cc* has been established, then the value of resistor 72, inductor 70 and the number of turns of winding 56 are chosen so that core 54 will be switched to the "1" state within a short period of time after transistor 66 cuts off. It is, of course, necessary that the amount of current flowing through winding 56 and the resulting magnetomotive force must not be so great as to prevent the current flowing through core winding 60 from quickly switching core 54 to the "0" state during the period of time transistor 66 is bottomed. In general, the maximum period taken for switching the core from its "0" to its "1" state and from its "1" to its "0" state should not exceed one-half the period of maximum frequency of the input signal which the discriminator is designed to have applied to its input terminal. Inductor 70 has the function of reducing fluctuations in the amount of current flowing through bias winding 56 as a result of the induced E.M.F.'s in winding 56. Inductor 70 reduces the maximum amounts of power consumed by the circuit including winding 56 and the circuit including winding 60, so that the maximum power rating of the source of supply potential V*cc* is reduced.

It is a characteristic of magnetic cores having substantially rectangular hysteresis loops, such as is illustrated in Fig. 3, that the total change in magnetic flux Φ as the core switches from its "1" to its "0" state, or from a "0" to its "1" state, is substantially a constant. This is based on the assumption that the temperature of the magnetic core is maintained substantially constant. The relation between the voltages induced in a winding and the change in magnetic flux through the winding is defined mathematically as:

$$e=kn\frac{d\phi}{dt} \qquad \text{Equation (1)}$$

where:

$e$=voltage, in volts
$n$=number of turns of the winding
$k$=a constant
$\phi$=magnetic flux, maxwells
$t$=time, in seconds Integrating Equation 1 produces the following:

$$\int_{t=0}^{t=T} e\,dt=kn\int_{-\phi_s}^{+\phi_s} d\phi \qquad \text{Equation (2)}$$

For a core having such a hysteresis loop as illustrated in Fig. 3, the total change in flux Φ as the core switches from its "1" to its "0" state is:

$$\Phi=2aB_s \qquad \text{Equation (3)}$$

where:

$a$=the cross-sectional area of the core

It thus follows that:

$$\int_{t=0}^{t=T} e\,dt = kn\Phi = K \qquad \text{Equation (4)}$$

where: K is a constant, or each time the core 54 switches from its "1" to its "0" state, for example, the voltage time product of the voltage pulse induced in output winding 62 will be a constant.

Fig. 2*d* illustrates the waveforms of the voltages induced in output winding 62, the positive pulses produced when the core switches from its "1" to its "0" state, are substantially in the form of square waves. The reason for this is that when transistor 66 is bottomed, the potential of its collector 68 is substantially at ground potential. The voltage across collector winding 60 is then substantially equal to the magnitude of V*cc*. Since voltage induced in output winding 62 is determined by the turns ratio between windings 60, 62 and the voltage across winding 60 is substantially a constant, the voltage induced in winding 62 will also be a constant. The waveform induced as the core switches from the "0" to the "1" state, the negative portion of Fig. 2*d*, is considerably more irregular. The reason for this is that the voltage across bias winding 56 varies depending upon the impedance of winding 56 which in turn is a function of the flux density of the core 54 while it is switching. Only the positive going portion of the voltage induced in output winding 62 is passed by the rectifier circuit 74. The reason for this is that the effectiveness of filter 78 is increased when square wave inputs are applied to it as compared to when more irregular waveforms are applied. It is, of course, true that the time product of both the positive pulses and the negative pulses induced in output winding 62 are constant and equal to one another.

The voltage time product of the voltage induced in output winding 62 when the core switches from its "1" to its "0" state depends only on the change in flux Φ as core 54 switches; and since this is substantially a constant, the voltage time product of the output voltage is independent of the values and the magnitude of the supply voltage of V*cc* over a substantial range of values. The minimum value of V*cc* is determined by the current required to switch core 54 through a complete cycle in a period of time which does not exceed the period of the highest frequency signal applied to the discriminator. The maximum value of V*cc* is determined by the maximum potential that the transistors 66, 80, and particularly transistor 80 in this application, can withstand reliably. The linearity of the discriminator is maintained as long as the supply voltage is within the above mentioned maximum and minimum values. Since this range is relatively large, the need for a very accurately regulated power supply does not exist.

With presently available transistors and cores, the discriminator described and claimed herein can be designed to operate through a spectrum of frequencies which covers the standard subcarrier frequencies used in telemetry; namely, 370 cycles per second to 80.5 kc. The maximum operating frequency of blocking oscillator 52 is determined by the present state of the art of transistors and magnetic cores. The discriminator can be adapted to handle input signals having input frequencies above and below the frequency range of blocking oscillator 52 by varying the ratio of the number of pulses oscillator 52 produces to the number of cycles of the input signal, by the use of scaling circuits, for example. The discriminator has theoretically perfect linearity if the temperature of the magnetic core is kept constant. Where the highest degree of linearity is desired, the use of a constant temperature environment for the core has proven a satisfactory means for obtaining this degree of accuracy.

In the example of the embodiments of the invention illustrated in Fig. 1, all the transistors have been illustrated and described as being pnp transistors. As is well known in the art, npn transistors may be substituted for pnp transistors provided the polarity of the supply voltages and the polarity of the triggering signals are reversed.

The values and/or types of components and the voltages appearing on the drawings are included, by way of example only, as being suitable for the devices illustrated. It is to be understood that circuit specifications in accordance with the invention may vary with the design for any particular application.

Obviously, many modifications and variations of the present invention are possible in the light of the above teachings. It is, therefore, to be understood that within the scope of the appended claims, the invention may be practiced other than as specifically described and illustrated.

What is claimed is:

1. In combination: a band-pass filter, first circuit means for squaring signals applied to said first circuit, a differentiating circuit, a blocking oscillator, a rectifying circuit and a low-pass filter, an input terminal adapted to have applied to it frequency modulated signals, said band-pass filter interconnecting the input terminal and said first circuit means, said first circuit means adapted to produce a square wave output signal of the same frequency as the signal passed through the band-pass filter, means for applying the square wave produced by the first circuit to the differentiating circuit, said differentiating circuit producing one trigger pulse for each square wave applied to it, circuit means for applying trigger pulses to the blocking oscillator, said blocking oscillator comprising a magnetic core having substantially rectangular hysteresis loop and a transistor, said core having four windings on it, a collector winding, a base winding, a bias winding and an output winding, said windings and transistor being so connected that a positive pulse and a negative pulse having substantially constant and substantially equal voltage time products are induced in the output winding for each trigger pulse applied to said blocking oscillator, said rectifying circuit connecting the low pass filter to the output winding of the blocking oscillator and adapted to apply pulses of one polarity induced in said output winding to the low pass filter.

2. A discriminator adapted to have an input signal applied to it comprising: in combination, means for producing one trigger pulse of a given polarity for a predetermined number of cycles of the signal applied to said discriminator, a blocking oscillator comprising a magnetic core having a substantially rectangular hysteresis loop and two saturated magnetic states, a transistor having a base, a collector and emitter, a power supply terminal adapted to be connected to a source of substantially constant potential, a first winding on said core adapted to apply said trigger pulses to the base of the transistor, a second winding on said core connected between the collector of the transistor and the power supply terminal, a third winding on said core connected between the power supply terminal and a point at reference potential, said windings being wound on said core in such manner that current flowing through the third winding will maintain the core in one of its two saturated magnetic states, the second winding being wound so that when the current flows through the second winding it will cause the core to switch to its other saturated magnetic state, and said first winding being wound so that a regenerative voltage will be induced in it as the core switches to its said other saturated magnetic state, means connecting the emitter of the transistor to said point at reference potential, an output winding wound on said core, a rectifying circuit and a low pass filter, said rectifying circuit being connected between the output winding and the low pass filter for applying pulses induced in said output winding of one polarity to said filter.

3. A discriminator adapted to have an input signal applied to it comprising: in combination, means for producing trigger pulses, the ratio of said trigger pulses to the number of cycles of the input signal applied to said discriminator being constant; a blocking oscillator comprising a magnetic core having a rectangular hysteresis loop, a transistor having a base, a collector, an emitter, a source of collector potential, a base winding, a bias winding, a collector winding and an output winding wound on said core, each of said windings having one of its two terminals dotted, the undotted terminal of said base winding being connected to the base of said transistor, the dotted terminal of the base winding being connected to said means for producing trigger pulses, said bias winding being connected across said source of collector potential in series with a resistor and an inductor, said bias winding being connected so that current flows out of its dotted terminal, said collector winding being connected between the collector and the source of collector potential so that current flows into its dotted terminal, said emitter being connected to ground; a rectifying circuit and a low pass filter, the rectifying circuit being connected between the output winding and the low pass filter, the rectifying circuit permitting pulses of one polarity in the output winding to be applied to said low pass filter.

4. A discriminator adapted to have an input signal applied to it comprising: in combination, means for producing trigger pulses, the ratio of said trigger pulses to the number of cycles of the input signal applied to said discriminator being constant; a blocking oscillator comprising a magnetic core having a substantially rectangular hysteresis loop, a transistor having a base, a collector and an emitter, a first power supply terminal and a second power supply terminal, the first power supply terminal adapted to be connected to one terminal of a source of collector potential and the second power supply terminal adapted to be at reference potential, a base winding, a bias winding, a collector winding and an output winding wound on said core, each of said windings having one of its two terminals identified as being dotted, the undotted terminal of said base winding being connected to the base of said transistor, the dotted terminal of the base winding being connected to said means for producing trigger pulses, and an inductor, said bias winding and said inductor being connected in series between the first and second power supply terminals, said bias winding being connected so that current flows out of its dotted terminal, said collector winding being connected between the collector and the first power supply terminal, so that current flows into its dotted terminal, said emitter being connected to the second power supply terminal; a rectifying circuit; and a low pass filter having an input terminal; the rectifying circuit comprising a second transistor having an emitter, a base and a collector, circuit means connecting the emitter of the second transistor to the dotted terminal of the output winding, circuit means connecting the undotted terminal of the output winding to the second power supply terminal, a resistor connecting the base of the second transistor to the second power supply terminal, and a diode being connected between the collector of the second transistor and the second power supply terminal; and circuit means for connecting the collector of the second transistor to the input terminal of the low pass filter.

References Cited in the file of this patent

UNITED STATES PATENTS

| | | |
|---|---|---|
| 2,232,858 | Lane | Feb. 25, 1941 |
| 2,467,777 | Rajchman | Apr. 19, 1949 |
| 2,476,849 | Ergen | July 19, 1949 |
| 2,584,990 | Diamond | Feb. 12, 1952 |
| 2,716,189 | Ayres | Aug. 23, 1955 |

OTHER REFERENCES

Abstract of application of Gillespie, Ser. No. 685,589, vol. 650, OG pp. 1195–1196, Sept. 25, 1951.

UNITED STATES PATENT OFFICE
CERTIFICATE OF CORRECTION

Patent No. 2,900,508 August 18, 1959

Robert M. Tillman

It is hereby certified that error appears in the printed specification of the above numbered patent requiring correction and that the said Letters Patent should read as corrected below.

Column 3, line 38, for "54 has switched to its "0" state. When core 54 reaches" read -- 54 from its "1" state to its "0" state. The change in --.

Signed and sealed this 12th day of April 1960.

(SEAL)
Attest:

KARL H. AXLINE
Attesting Officer

ROBERT C. WATSON
Commissioner of Patents